United States Patent
Corbett et al.

(10) Patent No.: US 8,939,439 B2
(45) Date of Patent: Jan. 27, 2015

(54) THRUST BEARING AND SUSPENSION FOR VEHICLE

(75) Inventors: Richard Corbett, Fondettes (FR);
Samuel Viault, Saint Antoine du Rocher (FR)

(73) Assignee: Aktiebolaget SKF, Gothenburg (SE)

( * ) Notice: Subject to any disclaimer, the term of this patent is extended or adjusted under 35 U.S.C. 154(b) by 168 days.

(21) Appl. No.: 13/513,990

(22) PCT Filed: Dec. 9, 2010

(86) PCT No.: PCT/EP2010/069290
§ 371 (c)(1),
(2), (4) Date: Aug. 10, 2012

(87) PCT Pub. No.: WO2011/070117
PCT Pub. Date: Jun. 16, 2011

(65) Prior Publication Data
US 2012/0292841 A1    Nov. 22, 2012

(30) Foreign Application Priority Data

Dec. 10, 2009   (FR) ........................... 09 58854

(51) Int. Cl.
*B60G 15/00*   (2006.01)
*B60G 15/06*   (2006.01)

(52) U.S. Cl.
CPC ........ *B60G 15/068* (2013.01); *B60G 2204/418* (2013.01)
USPC ............................. 267/220; 267/33; 384/609

(58) Field of Classification Search
CPC ................... B60G 2204/128; B60G 2204/418; B60G 2204/45021; B60G 15/068; B60G 2202/312

USPC ......... 188/321.11; 267/33, 220; 280/124.147, 280/124.155, 124.177; 384/420, 590, 609, 384/618

See application file for complete search history.

(56) References Cited

U.S. PATENT DOCUMENTS

| 4,618,127 | A | * | 10/1986 | Le Salver et al. | ............. 267/220 |
| 4,798,370 | A | * | 1/1989 | Inuzuka | ........................ 267/220 |
| 4,804,169 | A | * | 2/1989 | Hassan | ........................ 267/220 |
| 4,810,003 | A | * | 3/1989 | Pinch et al. | ............ 280/124.155 |
| 5,248,134 | A | * | 9/1993 | Ferguson et al. | ............ 267/220 |

(Continued)

FOREIGN PATENT DOCUMENTS

| DE | 10126680 C1 | * | 1/2003 | |
| DE | 10327676 A1 | * | 1/2005 | ............... F16F 9/54 |

(Continued)

*Primary Examiner* — Bradley King
*Assistant Examiner* — Stephen Bowes
(74) *Attorney, Agent, or Firm* — Bryan Peckjian; SKF USA Inc. Patent Department

(57) ABSTRACT

Suspension thrust bearing device comprising a rolling bearing (2) and a bottom cover (4) having a bearing surface capable of accommodating a suspension spring (5), the bottom cover (4) comprising a reinforcing framework (8), which framework has a bearing collar (17) placed axially between the rolling bearing (2) and the bearing surface of the spring (5), the framework (8) also comprising an inner radial extension (19). The framework comprises an axial portion (20) extending in a direction away from the rolling bearing (2), protruding axially relative to the inner radial extension (19) and being situated radially outside the radial extension so as to be able to accommodate a shock-absorbing pad.

12 Claims, 2 Drawing Sheets

(56) References Cited

U.S. PATENT DOCUMENTS

| | | | |
|---|---|---|---|
| 5,263,694 A * | 11/1993 | Smith et al. | 267/220 |
| 5,275,389 A * | 1/1994 | Pinch et al. | 267/220 |
| 6,616,160 B2 * | 9/2003 | Tadano | 280/124.147 |
| 6,640,942 B2 * | 11/2003 | Wakita | 188/321.11 |
| 2005/0242542 A1 | 11/2005 | Handke et al. | |

FOREIGN PATENT DOCUMENTS

| | | |
|---|---|---|
| FR | 2857906 A1 | 1/2005 |
| FR | 2859513 A1 | 3/2005 |
| FR | 2863944 A1 | 6/2005 |
| FR | 2899154 A1 | 10/2007 |
| GB | 2347906 A | 9/2000 |

* cited by examiner

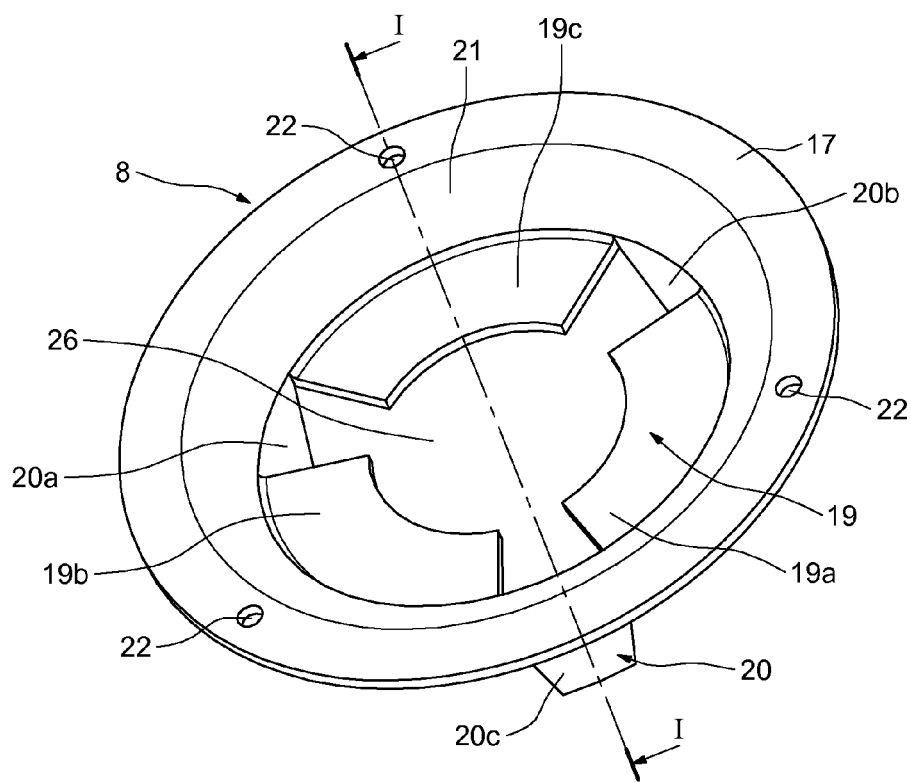
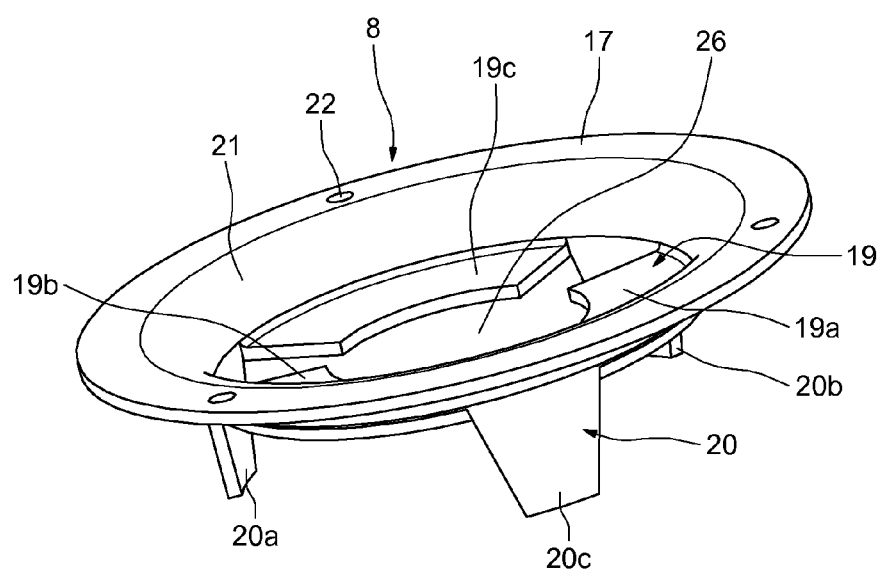

THRUST BEARING AND SUSPENSION FOR VEHICLE

CROSS-REFERENCE

This application is the U.S. national stage of International Application No. PCT/EP2010/069290 filed on Dec. 9, 2010, which claims priority to French Application No. FR 0958854 filed Dec. 10, 2009.

FIELD OF THE INVETNION

The invention relates to the field of suspension thrust bearing devices used in particular on motor vehicles in the telescopic MacPherson struts of the steered wheels. The suspension thrust bearing device is usually placed in the top portion of the MacPherson strut between a suspension spring and a supporting block secured to the body shell of the vehicle.

BACKGROUND OF THE INVENTION

The suspension spring is placed around the rod of a damper piston the end of which, usually the end of the piston rod, is secured to the supporting block. The suspension thrust bearing device thus makes it possible to transmit axial forces between the spring and the body shell of the vehicle while allowing a relative angular movement between a bearing mount of the spring, that is able to rotate, and the supporting block that is fixed and secured to the body shell of the vehicle. This relative angular movement can arise from a steering of the steered wheel and/or from the compression of the suspension spring.

Certain suspension thrust bearing devices are fitted with shock-absorbing pads surrounding the rod of the damper cylinder and designed to be compressed between the body of the cylinder and the device when there are extreme travels of the suspension. This prevents the damper rod from bottoming in the cylinder.

Document GB 2 347 906 describes a suspension thrust bearing device comprising a bottom cover made of plastic having a radial extension extending towards the inside of the suspension spring and serving as a bearing surface for the shock-absorbing pad. Such a bottom cover lacks rigidity during impacts generated by extreme travels of the suspension.

Document FR 2 857 906 describes suspension thrust bearing device comprising a rolling bearing mounted on a bottom cover. The bottom cover described comprises a body made of synthetic material and a reinforcing metal insert covered by said cover. The metal insert gives the bottom cover a good mechanical strength to the axial forces generated by the compression of the shock-absorbing pad. Moreover, the metal insert is embedded into the body made of synthetic material. This makes it possible to use a raw steel insert and prevents having recourse to corrosion-prevention treatments of the insert. Moreover, the bottom cover described comprises an annular rib used for centring the spring and separating the bearing surfaces of the spring and of the shock-absorbing pad. When there are impacts generated by the extreme travels of the suspension, the shock-absorbing pad is compressed axially and extends radially. It is noted however that the annular rib can be damaged by the radial expansion of the shock-absorbing pad.

Document FR 2 899 154 also describes a suspension thrust bearing device of a vehicle fitted with a shock-absorbing pad. The device comprises a bottom cover placed between the spring and the shock-absorbing pad on one side and the bearing of the device on the other. A metal cup is interposed between the bottom cover and the shock-absorbing pad. The metal cup is used for the radial confinement of the shock-absorbing pad. This cup is an additional part making assembly of the suspension more complex. Moreover, the metal cup must be treated against corrosion. Moreover, the cup described has a bore for the passage of the damper rod. Finally, when there are extreme travels of the suspension, the metal edge of the passage bore of said cup can damage the shock-absorbing pad and reduce its service life.

The invention proposes a suspension thrust bearing device designed to accommodate a shock-absorbing pad and a telescopic strut which remedy the aforementioned drawbacks.

SUMMARY OF THE INVENTION

One object of the invention is to propose a suspension thrust bearing device with improved mechanical strength to the forces generated axially and radially by the shock-absorbing pad and to do so without making assembly of the device more complex.

According to one embodiment, the suspension thrust bearing device comprises a bottom cover having a bearing surface capable of accommodating a suspension spring and a rolling bearing in contact with the bottom cover. The bottom cover comprises a reinforcing framework, which framework has a bearing collar extending radially relative to the axis of the rolling bearing and placed axially between the rolling bearing and the bearing surface of the spring in order to reinforce the mechanical strength of the bottom cover to the axial loads originating from the forces exerted by the suspension spring. The framework comprises an inner radial extension and an axial portion extending in a direction away from the rolling bearing in axial protrusion relative to the inner radial extension and while being situated radially outside the radial extension so as to be able to accommodate a shock-absorbing pad. The inner radial extension and the axial portion are respectively capable of reinforcing the mechanical strength of the bottom cover to the axial and radial forces originating from said shock-absorbing pad.

The framework helps to mechanically stiffen the bottom cover against the axial forces exerted on the inner radial extension, notably by the shock-absorbing pad. The axial portion of the framework of the bottom cover improves the mechanical strength to the forces generated radially, notably by the shock-absorbing pad compressed when there are extreme travels of the suspension. Since the axial portion forms part of the framework of the bottom cover, there is no additional part relative to the framework portion axially stiffening the bottom cover. The assembling of the bottom cover or of the suspension is therefore particularly simple. Moreover, the bearing collar prevents the bottom cover from breaking apart radially.

According to one embodiment, the bearing collar and the inner radial extension are substantially parallel and connected together by a connection portion, the radial extension being offset axially relative to the bearing collar on the side away from the rolling bearing. This makes it possible to reinforce the axial resistance of the bottom cover.

Advantageously, the connection portion is frustoconical, or partially toroidal with a centre of curvature of the torus situated on the side of the spring. This means that the suspension spring is better centred relative to the rolling bearing of the rolling-bearing device.

Advantageously, the axial portion protrudes axially from the connection portion.

According to one embodiment, the inner radial extension consists of a plurality of angular sectors.

Advantageously, the axial portion consists of a plurality of lugs placed angularly in alternation with the angular sectors of the radial extension.

Advantageously, the framework is made of pressed metal sheet, which makes it possible to obtain a low-cost framework.

Advantageously, the bearing collar has a plurality of through-holes participating in the attachment of the framework relative to the bottom cover.

According to one embodiment, the bottom cover comprises a body made of synthetic material overmoulded all round the framework. This makes it possible to avoid treating the metal framework of the cover against corrosion. The body made of synthetic material prevents any direct contact between the shock-absorbing pad and the edges of the framework. This also makes it possible to have a cover without sharp outer edges in contact with the shock-absorbing pad, which prevents reducing the service life of the shock-absorbing pad.

When the collar has through-holes, the latter make it possible to position the framework in the mould and to stiffen the bottom cover by virtue of the bridges of material passing through said holes.

Advantageously, the body has a continuous annular portion coating the axial portion of the framework. When the shock-absorbing pad is squashed, the annular portion, reinforced by the axial portion of the framework, radially confines the shock-absorbing pad which makes it possible to increase the axial stiffness of the shock-absorbing pad after the beginning of the squashing.

Advantageously, the body of the bottom cover comprises a retaining rim protruding from the annular portion in an inner radial direction. The rim is situated at an axial distance from the inner extension, thus axially retaining the shock-absorbing pad. A bellows for protecting the damper cylinder may be attached to the shock-absorbing pad by means of this rim, which simplifies the suspension thrust bearing device.

According to another aspect, the invention also relates to a telescopic strut comprising a suspension thrust bearing device as described above, a suspension cylinder and a suspension spring coaxial with the rolling bearing and also comprising a shock-absorbing pad one end of which can rest against the bottom cover in the zone of the inner radial extension of the framework while being surrounded by the axial portion of the framework.

BRIEF DESCRIPTION OF THE DRAWINGS

The present invention will be better understood on studying the detailed description of one embodiment taken as a non-limiting example and illustrated by the appended drawings, in which:

FIG. 2 is a first view in perspective of the metal framework provided in the bottom cover of the device of FIG. 1; and FIG. 3 is another view in perspective of the same metal framework.

DETAILED DESCRIPTION OF THE PREFERRED EMBODIMENTS

Figure 1:
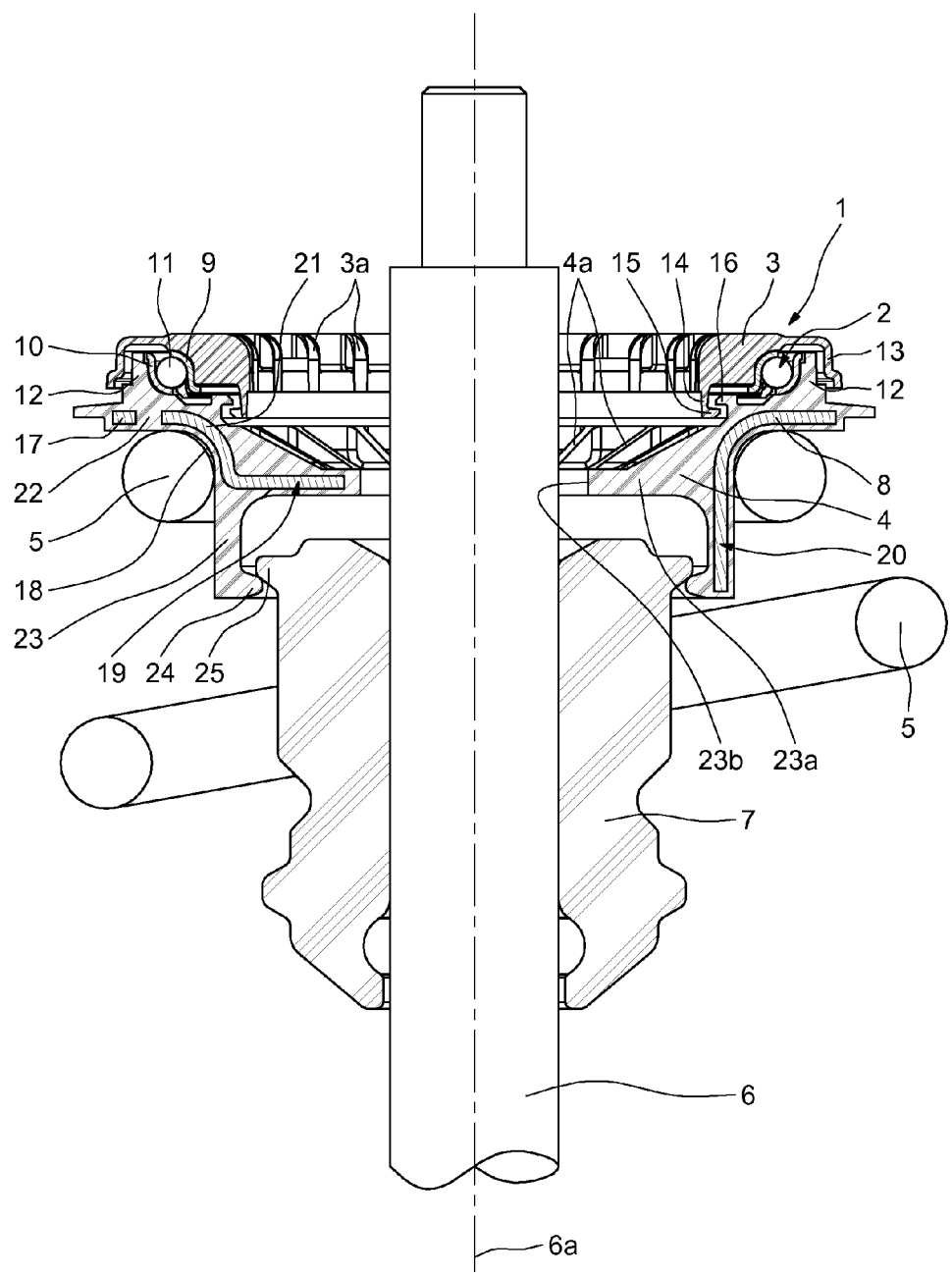
FIG. 1 is a view in axial section of a suspension thrust bearing device according to the invention, the section being made along I-I of FIG. 2.

The suspension thrust bearing device referenced 1 in its entirety in FIG. 1 comprises a rolling bearing 2 mounted between a top cover 3 having reinforcing ribs 3a on its bore and a bottom cover 4 having reinforcing ribs 4a of substantially triangular section in the vicinity of its bore. The device 1 is incorporated into a telescopic MacPherson strut comprising a suspension spring 5 the top turn of which rests on the bottom cover 4 and a suspension cylinder comprising a rod 6 with an axis 6a that is assumed to be vertical. A shock-absorbing pad 7 made of a flexible material such as a rubber or similar material is mounted on the top portion of the rod 6 inside the turns of the spring 5 and interacts with the bottom cover 4 as will be explained in detail below. The suspension thrust bearing device 1 is connected by means of the top cover 3 to the body shell of the vehicle not shown in the figure.

The bottom cover 4, with its axis 6a, comprises a body made of synthetic material overmoulded round a reinforcing framework 8 the structure of which can be seen more particularly in FIGS. 2 and 3 and which is, in the example illustrated, made of pressed metal sheet.

The rolling bearing 2, with its axis 6a, is, in the example illustrated, a ball bearing. It comprises a top ring 9 made of pressed metal sheet, a bottom ring 10 also made of pressed metal sheet and a row of balls 11. The rolling elements formed by the balls 11 are placed between raceways formed by the top ring 9 and bottom ring 10, which can be obtained from one and the same metal sheet blank by cutting and pressing by virtue of the fact that the outer diameter of the top ring 9 is substantially equal to the inner diameter of the bottom ring 10. The top ring 9 is in contact via a toroidal surface with the top cover 3 which the top ring 9 matches in shape. The bottom ring 10 also has a toroidal portion the top surface of which forms the raceway for the balls 11 and which comes into contact externally with a corresponding toroidal surface of an annular rim 12 of the bottom cover 4.

The top cover 3, with its axis 6, has an outer axial skirt 13 and an inner axial skirt 14. The rolling bearing 2 is completely housed between the two skirts 13 and 14. The outer skirt 13 leaves a free space between it and the annular rim 12 of the bottom cover, thus forming a seal of the labyrinth type for the rolling bearing 2. On the inside, the axial skirt 14 has a plurality of hooks 15 directed radially outwards which can interact with the corresponding hooks 16 directed radially inwards and forming part of the bottom cover 4. In this manner, the bottom cover 4, the top cover 3 and the rolling bearing 2 can form a single assembly making it easier to store and handle the suspension thrust bearing device 1 before it is mounted. In operation, a free space is retained between the respective hooks 15 and 16, thus forming a labyrinth seal to seal the rolling bearing 2.

The reinforcing framework 8, that can be seen in FIGS. 1 to 3, is fully embedded into the bottom cover 4 and has an annular outer bearing collar 17 extending radially relative to the axis 6a of the rolling bearing 2 which is also the axis of the reinforcing framework 8. As can be seen in FIG. 1, the bearing collar 17 is placed axially between the rolling bearing 2 and the top turn of the spring 5 which rests on the bottom cover 4 via a toroidal surface 18 of said cover 4. The bearing collar 17 makes it possible to increase the mechanical resistance of the bottom cover 4 to the axial loads originating from the forces exerted by the suspension spring 5.

The reinforcing framework 8 also comprises an inner radial extension 19 which consists, as can be seen notably in FIG. 2, of three angular sectors 19a, 19b and 19c distributed evenly, leaving a circular passageway 26 in their centre. The inner radial extension 19 is offset radially inwards and axially downwards relative to the outer bearing collar 17. The angular sectors 19a to 19c are identical to one another and in this instance extend in the circumferential direction over an angular sector of approximately 100°. The angular sectors 19a to 19c extend radially inwards.

The reinforcing framework 8 also comprises an axial portion 20 consisting of three lugs 20a, 20b and 20c placed angularly in alternation with the angular sectors 19a, 19b, 19c and extending axially on the side away from the bearing collar 17 and from the rolling bearing 2, i.e. axially downwards. The axial portion 20 is offset radially outwards relative to the inner radial extension 19 and radially inwards relative to the outer bearing collar 17.

In the example illustrated, the reinforcing framework 8 is obtained at least cost from a thin metal sheet blank by pressing, the lugs 20a, 20b, 20c being obtained by cutting the inner radial extension 19 and bending the cut elements thus obtained to the axial position that can be seen in the figures. The result of this is that the lugs 20a, 20b, 20c have a trapezoidal shape as can be seen in FIGS. 2 and 3. It will of course be understood that the number of these lugs can be modified as can the number of the sectors 19a, 19b, 19c which form the radial extension 19. It is for example possible to provide, for the inner radial extension 19, two or four sectors, and, for the axial portion 20, two or four lugs.

Alternatively, the reinforcing framework 8 could also be obtained by machining. In this case, it is possible to provide, for the inner radial extension 19 and for the axial portion 20, a generally annular shape.

The outer bearing collar 17 and the inner radial extension 19 of the reinforcing framework 8 are substantially parallel and are connected together by an annular connection portion 21. The axial portion 20 extends axially downwards the bottom end of the connection portion 21, the inner radial portion 19 radially extending said end inwards. In the example illustrated, the connection portion 21 is of toroidal shape, the centre of curvature of the torus being situated towards the outside, that is to say on the side of the spring 5. As a variant, the connection portion 21 could be frustoconical.

Through-holes 22, in this instance three in number, are provided in the bearing collar 17 while also being distributed over the circumference at 120° from one another. In the example illustrated, each of the holes 22 is made in a portion of the bearing collar 17 which is radially in the continuity of one of the sectors 19a, 19b or 19c. These holes 22 make it possible to improve the coupling of the synthetic material forming the body of the bottom cover 4, a synthetic material which is overmoulded onto the reinforcing framework 8. Specifically, during the overmoulding operation, the synthetic material which surrounds the whole of the reinforcing framework 8 penetrates the through-holes 22 as can be seen in FIG. 1. The reinforcing framework 8 is thus completely embedded into the synthetic material forming the body of the bottom cover 4. Alternatively, it could be possible to have the reinforcing framework 8 partially embedded into the synthetic material forming the body of the bottom cover 4. By virtue of the particular shape of the reinforcing framework 8, the axial loads originating from the forces of the suspension spring 5 are absorbed by the bearing collar 17 while the radial loads originating from the spring 5 are absorbed by the connection portion 21.

The body of the bottom cover 4 has, at its bottom end, a continuous annular portion 23 extending axially downwards and into which the lugs 20a, 20b, 20c which form the axial portion 20 of the reinforcing framework 8 are sunk or embedded. This annular portion 23 axially follows a radial portion 23a inside which the sectors 19a, 19b and 19c are embedded and which has a bore 23b for the rod 6 to pass through. The annular portion 23 comprises, in its bottom portion, a retaining rim 24 which protrudes radially inwards and which is axially at a distance from the inner extension 19 of the reinforcing framework 8. This retaining ring 24 can interact with a protruding circular rib 25 provided on the shock-absorbing pad 7. The interaction of this rib 25 with the retaining rim 24 makes it possible to provide the axial hold of the shock-absorbing pad 7 relative to the suspension thrust bearing device 1. The top end of the shock-absorbing pad 7 is housed in the annular portion 23 of the bottom cover 4, an axial space remaining between this top end and the radial portion 23a.

The inner radial extension 19, consisting of the various sectors 19a, 19b, 19c, makes it possible to absorb the axial forces which may be exerted by the shock-absorbing pad 7 on the radial portion 23a of the bottom cover 4 during the compression impacts generated by extreme travels of the suspension. Specifically, during such travels, the shock-absorbing pad 7 is compressed axially against the radial portion 23a of the bottom cover 4, which also causes it to squash or expand radially outwards in the direction of the continuous annular portion 23. The axial portion 20 of the reinforcing framework 8 formed by the three lugs 20a, 20b, 20c makes it possible, for its part, to absorb the radial forces generated by the squashing of the shock-absorbing pad 7. Moreover, during this squashing, the continuous annular portion 23 reinforced by the axial portion 20 of the reinforcing framework 8 radially confines the shock-absorbing pad 7, which makes it possible to increase the axial stiffness of said shock-absorbing pad after it has begun to squash.

By virtue of the structure of the reinforcing framework 8, all of the axial and radial forces are absorbed which are exerted on the suspension thrust bearing device, at the same time by the suspension spring 5 and by the shock-absorbing pad 7, notably when there are compression impacts applied to the suspension. Moreover, the production of the bottom cover by overmoulding round a metal reinforcing framework makes it possible to prevent any risk of damage to the shock-absorbing pad during the extreme travels of the suspension, since the shock-absorbing pad comes into contact in this case with the synthetic material of the bottom cover 4 and no longer with the rigid material of the reinforcing framework.

The invention claimed is:

1. A suspension thrust bearing device comprising:
a bottom cover capable of receiving a bearing surface of a suspension spring and a rolling bearing, and directly contacting a shock-absorbing pad such that the bottom cover limits axial movement of the shock-absorbing pad in both axial directions, the bottom cover comprising a reinforcing framework provided with a bearing collar extending radially relative to the axis of the rolling bearing and placed axially between the rolling bearing and the bearing surface of the suspension spring in order to reinforce the mechanical strength of the bottom cover to the axial loads originating from the forces exerted by the suspension spring, the bearing collar being annular in shape, the reinforcing framework further provided with an inner radial extension, and wherein
the reinforcing framework comprises an axial portion extending in a direction away from the rolling bearing in axial protrusion relative to the inner radial extension while being situated radially outside the inner radial extension so as to be able to accommodate the shock-absorbing pad, the inner radial extension and the axial portion being respectively capable of reinforcing the mechanical strength of the bottom cover to the axial and radial forces originating from said shock-absorbing pad,
the reinforcing framework further comprises a connection portion adapted to directly connect the bearing collar to the axial portion and the inner radial extension.

2. The device according to claim 1, wherein the bearing collar and the inner radial extension are substantially parallel, and wherein the radial extension being offset axially relative to the bearing collar on the side away from the rolling bearing.

3. The device according to claim 2, wherein the connection portion is frustoconical, or partially toroidal with a centre of curvature of the torus situated on the side of the spring.

4. The device according to claim 2, wherein the axial portion protrudes axially from the connection portion.

5. The device according to one of claim 2, wherein the inner radial extension consists of a plurality of angular sectors.

6. The device according to claim 5, wherein the axial portion consists of a plurality of lugs placed angularly in alternation with the angular sectors of the radial extension.

7. The device according to claim 1, wherein the framework is made of pressed metal sheet.

8. The device according to claim 1, wherein the bearing collar has a plurality of through-holes.

9. The device according to claim 1, wherein the bottom cover comprises a body made of synthetic material overmoulded all around the framework.

10. The device according to claim 9, wherein the body has a continuous annular portion coating the axial portion of the framework.

11. The device according to claim 10, wherein the body has a retaining rim protruding from the annular portion in an inner radial direction, said rim being situated at an axial distance from the inner extension of the framework.

12. A telescopic strut comprising a suspension thrust bearing device according to claim 1 wherein the suspension spring and a suspension cylinder are coaxial with the rolling bearing, and wherein one end of the shock-absorbing pad can rest against the bottom cover in a radial location that is between the radial ends of the inner radial extension of the framework and an axial location that is between the axial ends of the axial portion of the framework.

* * * * *